(12) United States Patent
Fu et al.

(10) Patent No.: US 12,410,780 B2
(45) Date of Patent: Sep. 9, 2025

(54) SYSTEM AND METHOD FOR CONTROLLING A WIND TURBINE

(71) Applicant: General Electric Company, Schenectady, NY (US)

(72) Inventors: Xu Fu, Clifton Park, NY (US); Hema Kumari Achanta, Schenectady, NY (US); Satya Mohan Vamsi Andalam, Bangalore (IN)

(73) Assignee: GE Vernova Renovables Espana, S.L., Barcelona (ES)

( * ) Notice: Subject to any disclaimer, the term of this patent is extended or adjusted under 35 U.S.C. 154(b) by 306 days.

(21) Appl. No.: 17/793,746

(22) PCT Filed: Jan. 24, 2020

(86) PCT No.: PCT/US2020/014914
§ 371 (c)(1),
(2) Date: Jul. 19, 2022

(87) PCT Pub. No.: WO2021/150239
PCT Pub. Date: Jul. 29, 2021

(65) Prior Publication Data
US 2023/0077025 A1   Mar. 9, 2023

(51) Int. Cl.
*F03D 17/00* (2016.01)
(52) U.S. Cl.
CPC ....... *F03D 17/0065* (2023.08); *F03D 17/028* (2023.08); *F05B 2260/84* (2013.01); *F05B 2260/845* (2013.01)

(58) Field of Classification Search
CPC .... F03D 17/0065; F03D 17/028; F03D 17/00; F03D 7/028; F05B 2260/84; F05B 2260/845; F05B 2270/808; Y02E 7/028
See application file for complete search history.

(56) References Cited

U.S. PATENT DOCUMENTS

| | | | |
|---|---|---|---|
| 7,062,370 B2 | 6/2006 | Vhora et al. | |
| 7,303,373 B2 * | 12/2007 | Viertl | G01D 5/35345 |
| | | | 416/61 |
| 9,645,574 B2 | 5/2017 | Frankenstein et al. | |

(Continued)

FOREIGN PATENT DOCUMENTS

| | | | | |
|---|---|---|---|---|
| CN | 101153809 A | * | 4/2008 | ............. F03D 17/00 |
| CN | 102 454 546 A | | 5/2012 | |

(Continued)

OTHER PUBLICATIONS

PCT International Search Report & Written Opinion Corresponding to PCT/US2020/014914 on Sep. 25, 2020.

(Continued)

*Primary Examiner* — Nathaniel E Wiehe
*Assistant Examiner* — Wayne A Lambert
(74) *Attorney, Agent, or Firm* — Dority & Manning, P.A.

(57) ABSTRACT

A system and method are provided for controlling a wind turbine. Accordingly, a component of the wind turbine is monitored by at least one sensor of a sensor system. An output is received from the sensor system which indicates a fault with the sensor. A fault accommodation response is generated by a fault module. The fault accommodation response includes an accommodation signal which replaces the output signal of the faulty sensor.

16 Claims, 5 Drawing Sheets

(56) References Cited

U.S. PATENT DOCUMENTS

| | | |
|---|---|---|
| 9,752,561 B2 | 9/2017 | Egedal et al. |
| 9,983,555 B2 | 5/2018 | Bengston |
| 10,344,740 B2 | 7/2019 | Caponetti et al. |
| 10,605,233 B2 * | 3/2020 | Thøgersen ............... F03D 1/06 |
| 11,371,486 B2 * | 6/2022 | Schmid ................. F03D 17/00 |
| 2004/0057828 A1 * | 3/2004 | Bosche ................ F03D 7/046 |
| | | 416/31 |
| 2010/0138188 A1 * | 6/2010 | Mengane ............. F03D 7/047 |
| | | 702/182 |
| 2011/0148112 A1 | 6/2011 | Ormel et al. |
| 2013/0110414 A1 | 5/2013 | Caponetti et al. |
| 2013/0174664 A1 | 7/2013 | Olesen |
| 2013/0214535 A1 | 8/2013 | Brath |
| 2013/0230400 A1 * | 9/2013 | Gao ....................... F03D 7/047 |
| | | 416/31 |
| 2014/0003939 A1 | 1/2014 | Adams et al. |
| 2015/0005966 A1 | 1/2015 | Gerber et al. |
| 2016/0252075 A1 | 9/2016 | Kruger et al. |
| 2018/0156200 A1 * | 6/2018 | Caponetti .............. F03D 17/00 |
| 2018/0180029 A1 * | 6/2018 | Caponetti .............. F03D 17/00 |
| 2018/0335018 A1 | 11/2018 | Cao et al. |
| 2020/0318611 A1 * | 10/2020 | Gupta ................. F03D 7/0224 |
| 2022/0252051 A1 * | 8/2022 | Esbensen ............ F03D 17/005 |

FOREIGN PATENT DOCUMENTS

| | | | |
|---|---|---|---|
| CN | 102175449 B | 7/2012 | |
| CN | 104 595 112 A | 5/2015 | |
| CN | 109460621 A | 3/2019 | |
| DE | 102013208084 B3 | 5/2014 | |
| EP | 2 589 943 A1 | 5/2013 | |
| EP | 3760861 A1 * | 1/2021 | ............ F03D 17/00 |

OTHER PUBLICATIONS

Badihi et al., A Review on Application of Monitoring, Diagnosis, and Fault-tolerant Control to Wind Turbines, 2013 Conference on Control and Fault-Tolerant Systems (SysTol), Nice, France, Oct. 9-11, 2013, pp. 365-370.

Badihi et al., Model-Based Fault-Tolerant Pitch Control of an Offshore Wind Turbine, IFAC—Papersonline, vol. 51, Issue 18, 2018, pp. 221-226. (Abstract Only).

Cho et al., Model-based Fault Detection, Fault Isolation and Fault-tolerant Control of a Blade Pitch System in Floating Wind Turbines, Renewable Energy, vol. 120, May 2018, pp. 306-321.

Feng et al., A Model-Based Predictive Control for FTC for Wind Turbine Speed Sensor Fault, 2013 Conference on Control and Fault-Tolerant Systems (Systol), IEEE, XP032545765, Oct. 9, 2013, pp. 504-509. (Abstract Only).

Kavaz et al., Fault Detection of Wind Turbine Sensors Using Artificial Neural Networks, Journal of Sensors, Dec. 19, 2018, 12 Pages.

Chinese Office Action with Translation, Dec. 4, 2024.

* cited by examiner

SYSTEM AND METHOD FOR CONTROLLING A WIND TURBINE

RELATED APPLICATIONS

The present application claims priority to PCT Application Serial Number PCT/US2020/014914, filed on Jan. 24, 2020, which is incorporated by reference herein.

FIELD

The present disclosure relates in general to wind turbines, and more particularly to systems and methods for controlling wind turbines using a fault accommodation signal in response to a sensor fault.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Typically, a modern wind turbine employs component monitoring systems to monitor the operating conditions of the various components of the wind turbine. As such, the component monitoring systems typically include one or more sensors operably coupled to the various components of the wind turbine. The outputs of the sensors may be utilized by a controller to adjust an operating parameter of the wind turbine to maximize power production and prevent, or limit, damage to the wind turbine. However, over the lifespan of the wind turbine, the sensors may develop faults. As a result, the output of the component monitoring systems may be incomplete and/or erroneous.

Often, when a turbine controller receives unacceptable information from the component monitoring system, the controller will implement an alternative control scheme. Typically, this control scheme includes significantly derating or parking the wind turbine in order to protect the components from developing an overload condition. However, the derating also results in a decrease in the power production of the wind turbine. As such, a need exists for systems and methods which facilitate wind turbine operations in the presence of a sensor fault while minimizing the derating of the wind turbine.

Thus, the art is continuously seeking new and improved systems to control the wind turbine. Accordingly, the present disclosure is directed to systems and methods for controlling a wind turbine via a fault accommodation.

BRIEF DESCRIPTION

Aspects and advantages of the invention will be set forth in part in the following description, or may be obvious from the description, or may be learned through practice of the invention.

In one aspect, the present disclosure is directed to a system for controlling a wind turbine. The system may include a sensor system having at least one sensor operably coupled to a component of the wind turbine so as to detect an operating condition of the component. The system may also include a controller communicatively coupled to the sensor system. The controller may include at least one processor configured to perform a plurality of operations. The plurality of operations may include detecting, via a fault module, an output signal of the sensor indicative of a sensor fault. The plurality of operations may also include generating, via the fault module, a fault accommodation signal. Further, the plurality of operations may include replacing the output signal of the sensor with the fault accommodation signal so as to cause a change in an operating state of the wind turbine.

In another aspect, the present disclosure is directed to a method for controlling a wind turbine. The method may include receiving, via a controller, data indicative of an operating condition of a component of the wind turbine from a sensor system. The sensor system may include the sensor operably coupled to the component. The method may also include detecting, via a fault module, an output signal from the sensor indicative of a sensor fault. Further, the method may include generating, via the fault module, a fault accommodation response. The fault accommodation response may include an accommodation signal which replaces the output signal indicative of the sensor fault. Additionally, the method may include causing, via the controller, a change in an operating state of the wind turbine based at least upon the accommodation signal. It should be understood that the method may further include any of the additional features and/or steps described herein.

In yet another aspect, the present disclosure is directed to a wind turbine. The wind turbine may include a tower secured atop a foundation, a nacelle mounted atop the tower, a rotor mounted to the nacelle, at least one rotor blade mounted to the rotor, and a blade monitoring system operably coupled to the rotor blade. The blade monitoring system may include a sensor system comprising the sensor operably coupled to the rotor blade so as to detect an operating condition of the component. The blade monitoring system may also include a controller communicatively coupled to the sensor system. The controller may include at least one processor configured to perform a plurality of operations. The plurality of operations may include detecting, via a fault module, an output signal of the sensor indicative of a sensor fault. The plurality of operations may include generating, via the fault module a fault accommodation signal. Additionally, the plurality of operations may include replacing the output signal of the sensor with the fault accommodation signal so as to cause a change in an operating state of the wind turbine. It should be understood that the wind turbine may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine. In particular, the present disclosure includes a system and method which facilitate operating the wind turbine when at least one sensor has failed. Specifically, the present disclosure may include a system which detects an output signal indicating that one or more sensors is faulty. The system may, in response to the indication(s) of a faulty sensor, generate a fault accommodation signal. Thus, the fault accommodation signal may be substituted for the faulty signal to maintain continued control of the wind turbine. More specifically, the fault accommodation signal may be generated by leveraging sensor redundancy to emulate the missing signal by modifying a signal from an additional sensor coupled to the same component. Additionally, inputs from additional sensor systems coupled to the wind turbine or additional components of the wind turbine may also be employed to model the signal which would have been received from the sensor had it been operational. Therefore, it should be appreciated that the utilization of the fault accommodation signal may permit the continued operation of the wind turbine in a configuration which maximizes power production in the presence of a sensor fault.

Figure 1:
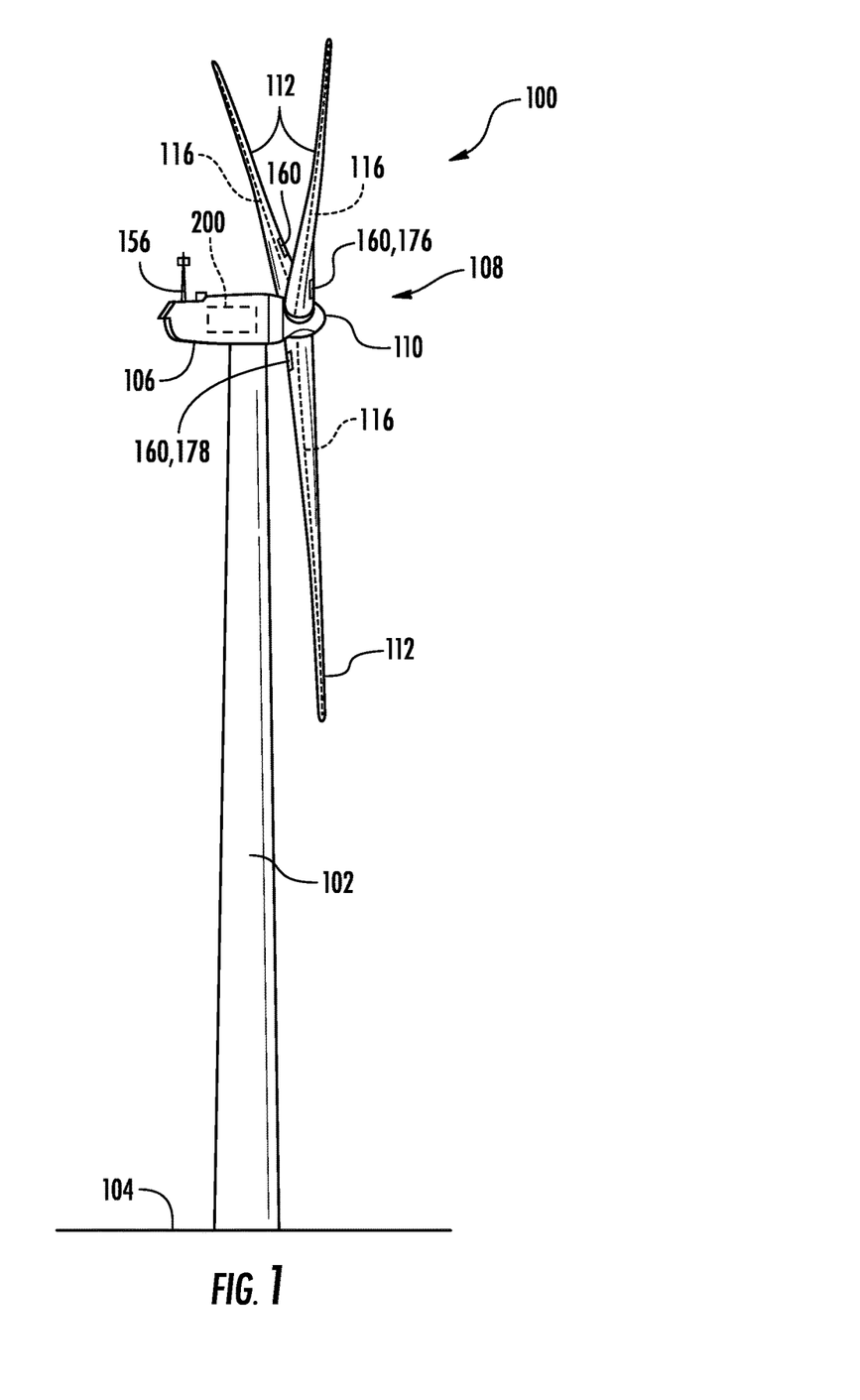
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
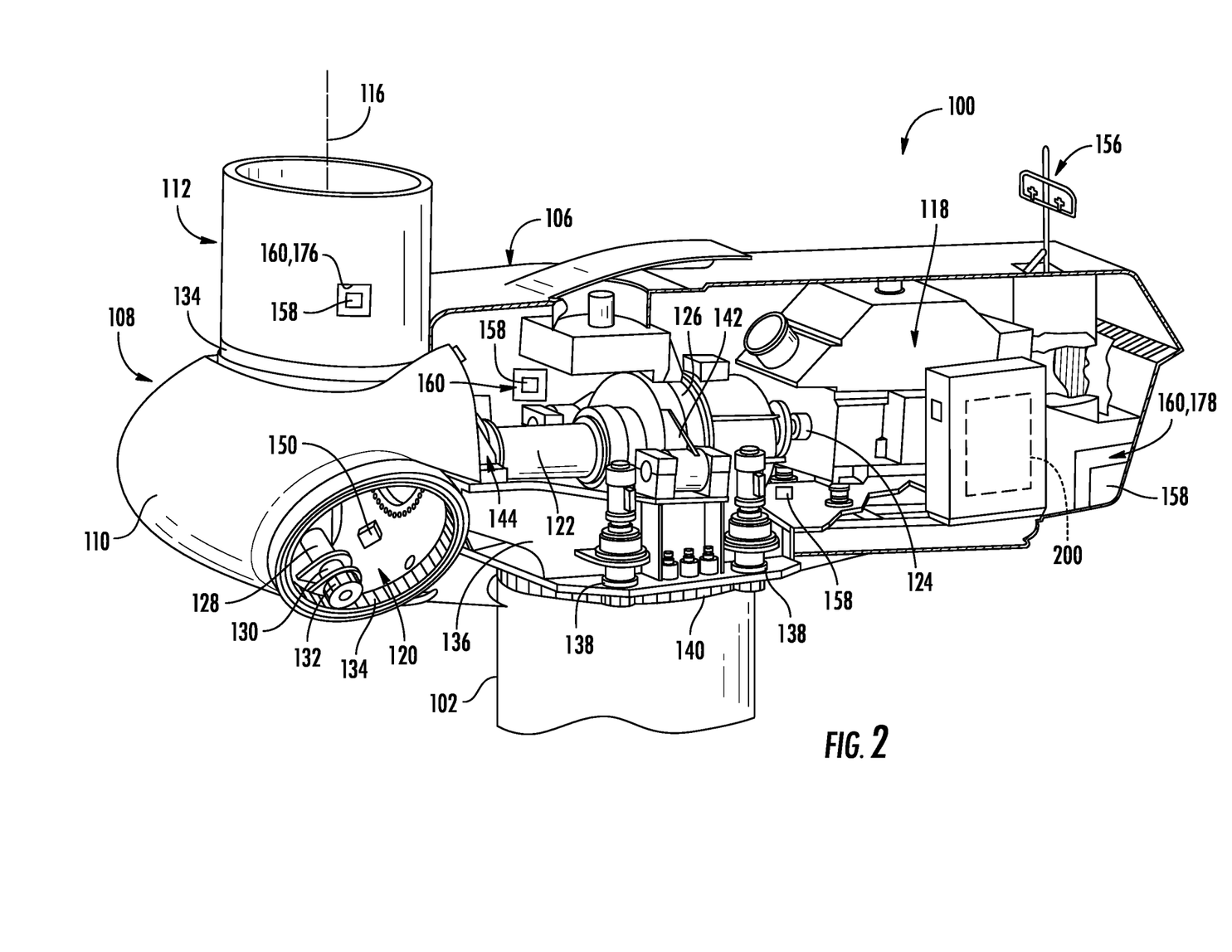
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the controller 200. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Still referring to FIG. 2, the wind turbine 100 may include a component monitoring system, such as at least one sensor system 160, having one or more sensors 156, 158 that can monitor the performance of the wind turbine 100 and/or environmental conditions affecting the wind turbine 100. In particular embodiments, as will be discussed in FIG. 5, the sensor system 160 may be a first sensor system 176 and the wind turbine 100 may further include a second sensor system 178.

In an embodiment, for example, the sensor system 160 may include a plurality of sensors configured to monitor a single attribute or a plurality of attributes of one or more wind turbine components. For example, in an embodiment, a first set of sensors may be configured as strain gauges configured to detect a tensile load on the component, while another set of sensors may be configured to monitor temperature changes within the component. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine the condition of the wind turbine 100.

For example, in an embodiment, the wind turbine 100 may include an environmental sensor 156 configured for gathering data indicative of at least one environmental condition. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include one or more operating sensors 158. The operating sensor(s) 158 may be configured to detect a performance of the wind turbine 100 in response to the environmental condition. Further, the operating sensor(s) 158 may, for example, be a sensor configured to monitor electrical properties of the output of the generator 118 of the wind turbine 100, such as current sensors, voltage sensors temperature sensors, or power sensors that monitor power output directly based on current and voltage measurements.

In another embodiment, the operating sensor(s) 158 may include any other sensors that may be utilized to monitor the operating state of the wind turbine 100. More specifically, the operating sensor(s) 158 may be a rotational speed sensor operably coupled to the controller 200. The operating sensor(s) 158 may be directed at the rotor shaft 122 of the wind turbine 100. The operating sensor(s) 158 may gather data indicative of the rotational speed of the rotor shaft 122, and thus the rotor 108. The operating sensor(s) 158 may, in an embodiment, be an analog tachometer, a D.C . . . tachometer, an A.C . . . tachometer, a digital tachometer, a contact tachometer a non-contact tachometer, or a time and frequency tachometer.

In an additional embodiment, the operating sensor(s)(s) 158 may be a pitch sensor. As such, the controller 200 may receive a pitch setpoint indication for the rotor 108 of the wind turbine 100 via the operating sensor(s) 158 operably coupled to the pitch control mechanism 120. The controller 200 may consider the pitch setpoint indication in light of the environmental condition so as to determine whether the pitch of the rotor 108 is an operating state which may be changed to satisfy a required power production.

Figure 3A:
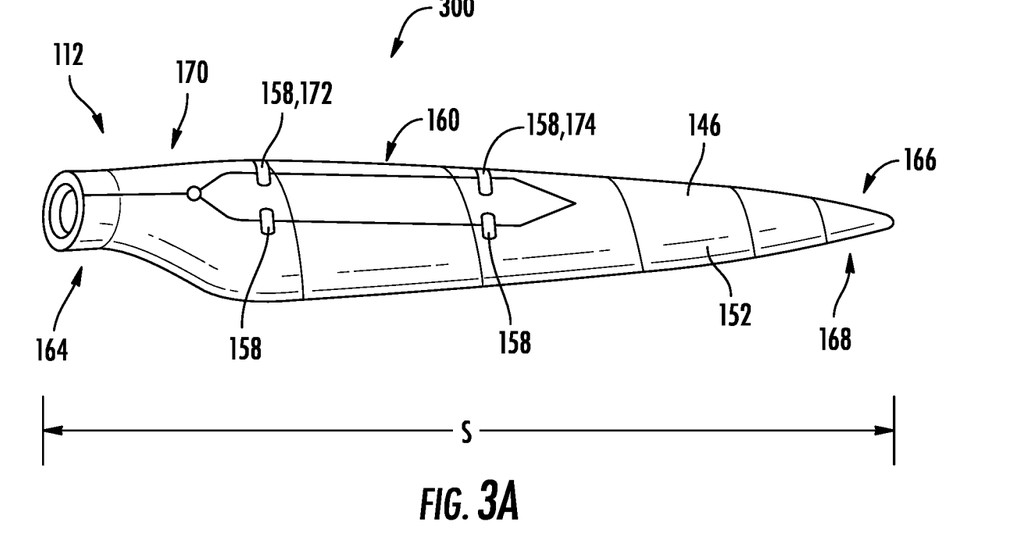
FIG. 3A illustrates a perspective view of one embodiment of a rotor blade equipped with a blade monitoring system according to the present disclosure.
Figure 3B:
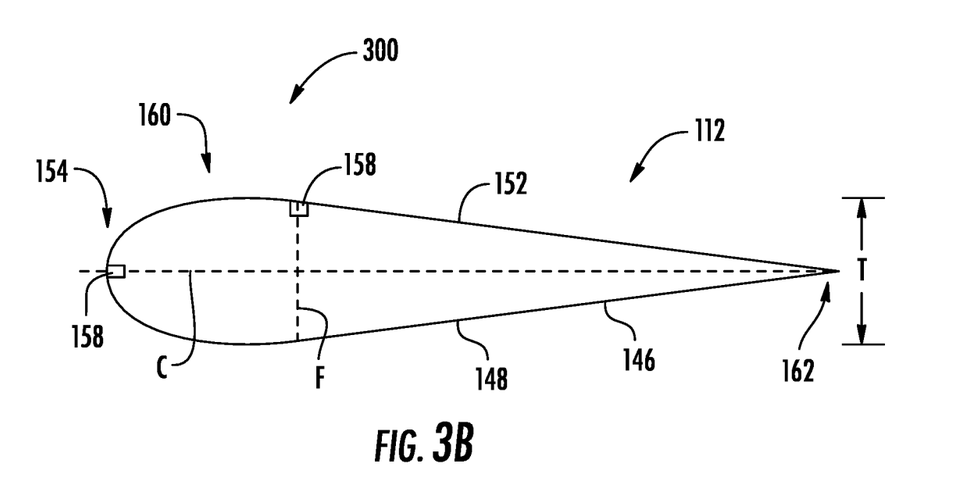
FIG. 3B illustrates a cross-sectional view of the rotor blade of FIG. 3A according to the present disclosure.

Referring now to FIGS. 3A and 3B, the rotor blade 112 may include an outer surface 146 defining a pressure side 148 and a suction side 152 extending in a chordwise (C) direction between a leading edge 154 and a trailing edge 162. A thickness (T) of the rotor blade 112 may be defined in a flapwise (F) direction between the pressure and suction sides 148, 152 The rotor blade 112 may also extend in a spanwise (S) direction between a root 164 and a blade tip 166. In at least one embodiment, the rotor blade 112 may be a segmented rotor blade having at least a tip section 168 and a root section 170.

Further, as shown, the rotor blade 112 may, may be equipped with the sensor system 160 described herein. In such an embodiment, the sensor system 160 may be configured as a blade monitoring system. When configured as a blade monitoring system, the sensor 158 may be a strain gauge configured to detect bending moments within the rotor blade 112 while operating. In such embodiments, the sensor(s) of the sensor system 160 may be positioned at different locations about the rotor blade 112. For example, as shown, a first sensor 172 may be positioned at a first spanwise location in proximity to the leading edge 154 and a second sensor 174 may be positioned at a second spanwise location in proximity to the leading edge 154. In such an embodiment, the sensors 172, 174 may be particularly adapted for detecting a bending moment resulting from a load along the leading edge 154 of the rotor blade 112. In an additional embodiment, the first sensor 172 may be positioned as stated previously, however the second sensor 174 may be positioned at the same spanwise location but at a different chordwise and flapwise location. In a further embodiment, two sensors 158 may be positioned at different spanwise locations along the leading edge 154 and two additional sensors 158 may be positioned at differing spanwise locations along the suction side 152. It should be appreciated that any suitable number of sensors at any suitable location may be used to improve the fidelity of the output of the sensor system 160 as well as the redundancy of the sensor system 160.

Figure 4:
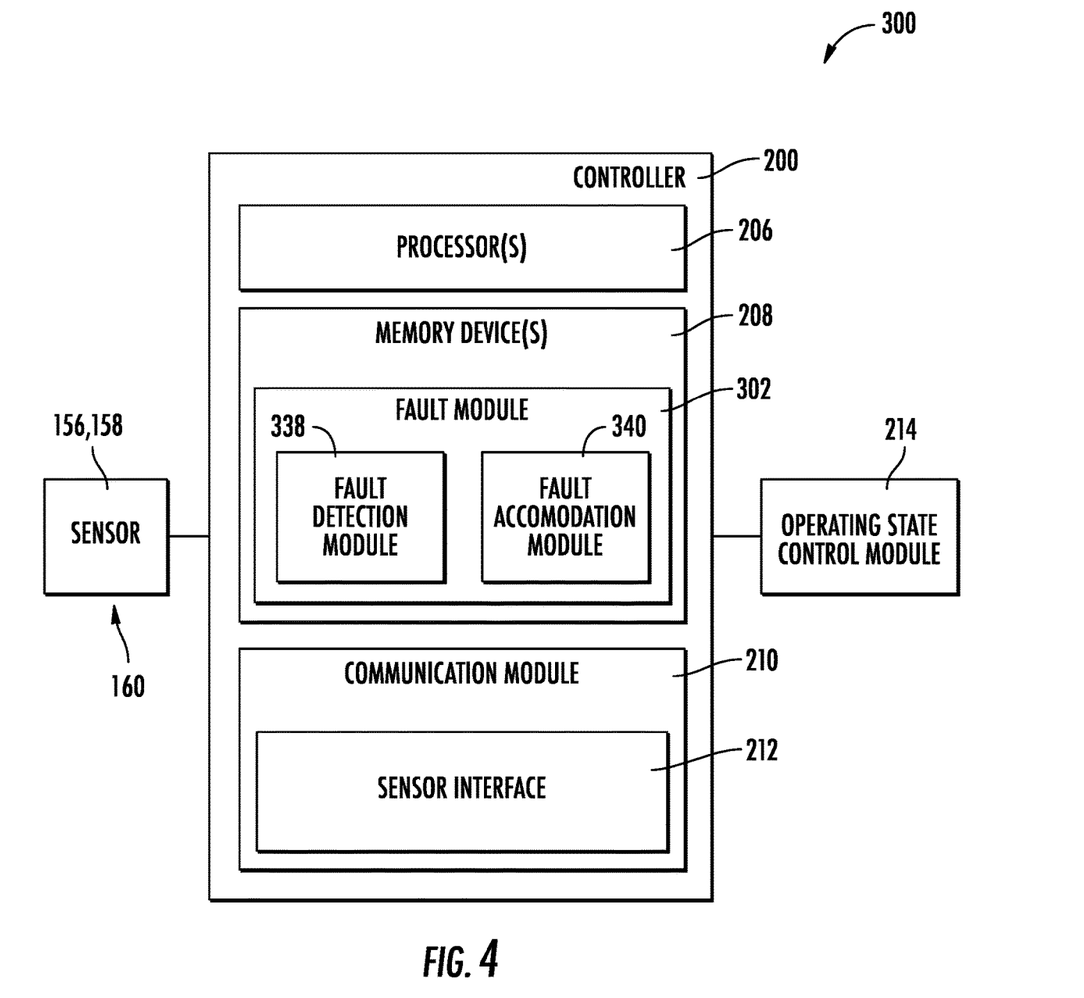
FIG. 4 illustrates a schematic diagram of one embodiment of a controller for use with the wind turbine according to the present disclosure.
Figure 5:
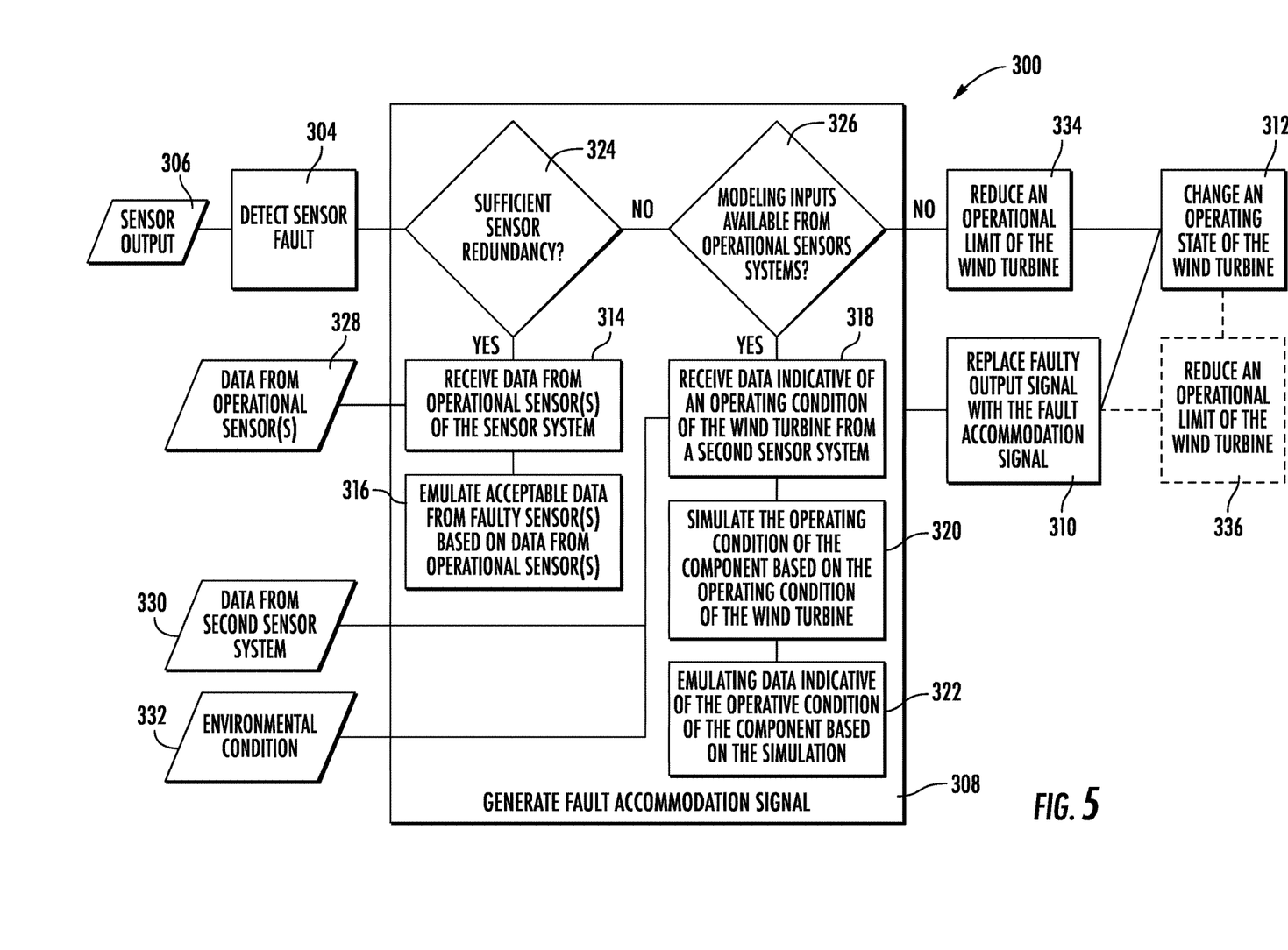
FIG. 5 illustrates a schematic diagram of one embodiment of a control logic of a system for controlling a wind turbine according to the present disclosure.

Referring now to FIGS. 4-5, schematic diagrams of multiple embodiments of a system 300 for controlling the wind turbine 100, e.g. that includes the sensor system 160, according to the present disclosure are presented. As shown particularly in FIG. 4, a schematic diagram of one embodiment of suitable components that may be included within the system 300 is illustrated. For example, as shown, the system 300 may include the controller 200 communicatively coupled to the sensor system 160. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158 may be communicatively coupled to the communications module 210 using any suitable means. For example, as shown in FIG. 4, the sensor(s) 156, 158 is coupled to the sensor interface 212 via a wired connection. However, in other embodiments, the sensor(s) 156, 158 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting, via a fault module 302, an output signal of the sensor 158 indicative of a sensor fault; and generating, via the fault module 302, a fault accommodation signal as described herein, as well as various other suitable computer-implemented functions. In at least one embodiment, the fault module 302 may include a fault detection module 338 and a fault accommodation module 340. In an embodiment, the fault detection module 338 may be configured to detect a sensor fault of the sensor 158. In an additional embodiment, the fault accommodation module 340 may be configured to generate a fault accommodation response which may include the fault accommodation signal.

Referring still to FIG. 4, in an embodiment, the system 300 may include a fault module 302, which may be a software module of the controller 200. In an additional embodiment, the fault module 302 may be a distributed controller 200 or a hardware card.

Referring particularly to FIG. 5 as shown at 304, the fault module 302 of the system 300 may be configured to detect an output signal 306 of the sensor system 160, which is indicative of a sensor fault. For example, the output signal 306 may include a sensor output (or lack of sensor output), which is indicative of a sensor fault. Thus, the sensor output 306 may be deemed unacceptable for use by the system 300 in controlling the wind turbine 100. Further, a sensor fault may be indicated by an absence of a signal from one or more sensors and/or a poor signal quality/resolution. In an additional embodiment, a sensor fault may be indicated by the sensor output 306 being out-of-range and/or lacking an azimuth signal. Additional sensor faults may include, but are not limited to, a zero-calibration-low fault, a strain sensor drift, a temperature sensor failure, and additive fault, a multiplicative fault, an output stuck fault and/or a slow drifting fault.

As shown at 308, the system 300 may also be configured to generate a fault accommodation signal via the fault module 302. Additionally, as shown at 310, the system 300 may replace the output signal 306 of the sensor 158 with the fault accommodation signal. Thus, as shown at 312, replacing the faulty output signal 306 with the fault accommodation signal, may cause a change in an operating state of the wind turbine 100. As shown at 334, wherein the generation of the fault accommodation signal is unfeasible, the system 300 may reduce an operational limit of the wind turbine 100. For example, when a sensor fault is detected but an accommodation signal is not available, the system 300 may de-rate the wind turbine 100 by establishing a thrust limit which is a percentage of a nominal thrust limit for the wind turbine 100.

In an embodiment, such as the embodiment of FIGS. 3A and 3B, the first sensor 172 of the sensor system 160 may be in a first position relative to the component and may be faulty, whereas the second sensor 174 may be operational. As such, in response to the detection of a sensor fault, at 304, the system 300 may be configured to utilize sensor redundancy in order to generate the fault accommodation signal at 308. Further, the system 300 may, at 314, receive data 328 indicative of the operating condition from the second sensor 174 in a second position relative to the component. As shown at 316, the system 300 may apply a weighting factor to the data received from the second sensor 174 so as to emulate acceptable data indicative of the operating condition from the first sensor 172. For example, the first sensor 172 may be positioned between the root 164 of the rotor blade 112 and the second sensor 174 in a region of the rotor blade 112 subjected to a greater bending moment than a region monitored by the second sensor 174. As such, the weighting factor may multiply the output of the second sensor 174 so as to emulate the output of an operational first sensor 172. In an additional embodiment, the weighting factor may also be combined with a bias term so as to emulate the acceptable data indicative of the operating condition from the first sensor. It should be appreciated that the weighting factor may be derived from a historical data set for the rotor blade 112 wherein the outputs of the plurality of sensors 158 are individually recorded as a time-series-data set.

In an additional embodiment, wherein the system 300 may be configured to utilize sensor redundancy in order to generate the fault accommodation signal at 308, the first sensor 172 may be configured to monitor a first attribute of the component and may be faulty. In such an embodiment, the system 300 may be configured to receive data indicative of a second monitored attribute from the second sensor 174. As shown at 316, the system 300 may apply a conversion factor to the data indicative of the second monitored attribute so as to emulate acceptable data indicative of the first monitored attribute from the first sensor 172. For example, in an embodiment, the first attribute may be a strain indicative of a bending moment while the second attribute may be a temperature, a vibration, or an acceleration. In such embodiments, the system 300 may utilize the conversion factor to extrapolate the bending moment which would be indicated by an operational first sensor 172 at the measured second attribute. It should be appreciated that the conversion factor may be derived from a historical data set for the rotor blade 112 wherein the outputs of the plurality of sensors 158 are individually recorded as a time-series-data set.

In another embodiment, the system 300 may be configured to emulate or utilize modeling to simulate the operating condition of the component. As such, as shown at 318, the system 300 may receive data 330 indicative of an operating condition of the wind turbine 100 from the second sensor system 178. As shown at 320, the system 300 may simulate the operating condition of the component based on the operating condition of the wind turbine as detected by the second sensor system 178. Based on the results of the simulation, as shown at 322, the system 300 may emulate data indicative of the operating condition of the component. It should be appreciated that the controller 200 may utilize the measured operating condition to extrapolate the output expected from an operational first sensor system 176.

In an embodiment, wherein the system 300 may be configured to emulate or utilize modeling to simulate the operating condition of the component, the second sensor system 178 may include the environmental sensor 156 and the operating sensor(s) 158. Based on these inputs, as shown at 320, the system 300 may correlate the operating condition of the component to the performance of the wind turbine for the detected environment condition 332 based on a historical data set. The historical data set may include wind turbine performance points in response to various environmental conditions and the corresponding operating condition of the component at the various wind turbine performance points. For example, the second sensor system 178 may indicate a power output of the generator 118 at a wind speed 332 detected by the environmental sensor 156. The controller 200 may then utilize the measured power output and wind speed to determine an amount of thrust from the rotor 108 necessary to result in the measured performance. This determination may, in turn, permit the controller 200 to determine a load experienced by the rotor blade 112 when producing the calculated thrust. Further, the controller 200 may emulate the output of an operational first sensor system 176 for a component under the calculated load.

In further embodiments, the system 300 may correlate monitored operating condition of a first component to monitored operating condition of a second component. For example, in an embodiment, the two components may correspond to two of the rotor blades 112. The system 300 may thus utilize the output of the second sensor system 178 as a substitute for the faulty signal from the first sensor system 176. It should be appreciated that the output of the second sensor system 178 may be time shifted relative to the required output from the first sensor system 176. As such, in at least one embodiment, the system 300 may employ a time-shift logic to account for the time shift and correlate the output of the second sensor system 178 to the required output from the first sensor system 176.

Referring still to FIG. 5, as shown at 308, the system 300 may be configured to generate the fault accommodation signal via one of the sensor redundancy methods or the modeling methods described herein. For example, in an embodiment, the system 300 may receive, from the first sensor system 176, data indicative of a first sensor system fault. The first sensor system fault may indicate an absence of sensor data available within the first sensor system 176 for emulating acceptable data from at least one sensor of the plurality of sensors 158. As such, as shown at 324, the system 300 may determine whether the number and/or type of operational sensors 158 of the first sensor system 176 are sufficient to emulate the data from the faulty sensors. In an embodiment, wherein the operational sensors provide sufficient redundancy to compensate for the faulty sensors, the system 300 may employ the sensor redundancy approach. In an embodiment, wherein system 300 determines that sufficient sensor redundancy is not present within the first sensor system 176, the system 300 may employ the modeling approach as discussed herein.

If the system 300 determines that the first sensor system 176 lacks sufficient sensor redundancy to emulate the absent sensor data from the faulty sensor, as shown at 326, the system 300 may determine whether modeling inputs are available from operational sensor systems. Thus, as shown at 334, the system 300 can determine that sufficient modeling inputs are unavailable and may reduce an operational limit of the wind turbine 100. As shown at 336, the system 300 may also reduce an operational limit of the wind turbine 100 when the fault accommodation signal is provided. It should be appreciated that a potential degradation in signal accuracy may result from the modeling and emulation of the faulty sensor output 306 when compared to data received via direct measurement. This, in turn, may result in a degradation of the precision of the control system of the wind turbine 100. As such, in an embodiment, an operational limit of the wind turbine 100 may be reduced so as to prevent an overload of the component. It should be further appreciated that the reduction in the operational limits may be less in embodiments wherein the accommodation signal is generated than in embodiments wherein an accommodation signal is not generated.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A system for controlling a wind turbine, the system comprising: a sensor system comprising at least one sensor operably coupled to a component of the wind turbine so as to detect an operating condition of the component; and a controller communicatively coupled to the sensor system, the controller comprising at least one processor configured to perform a plurality of operations, the plurality of operations comprising: detecting, via a fault module, an output signal of the at least one sensor indicative of a sensor fault, generating, via the fault module, a fault accommodation signal, and replacing the output signal of the at least one sensor with the fault accommodation signal so as to cause a change in an operating state of the wind turbine.

Clause 2. The system of any preceding clause, wherein the sensor system comprises a plurality of sensors operably coupled to the component, a first sensor of the plurality of sensors being in a first position and being faulty, a second sensor of the plurality of sensors being operational, and wherein generating the fault accommodation signal further comprises: receiving data indicative of the operating condition from the second sensor in a second position relative to the component, wherein the second position is different than the first position; and applying a weighting factor to the data received from the second sensor so as to emulate acceptable data indicative of the operating condition from the first sensor, wherein the weighting factor accommodates for the difference in locations of the first and second sensors.

Clause 3. The system of any preceding clause, wherein the sensor system comprises a plurality of sensors operably coupled to the component, a first sensor of the plurality of sensors is configured to monitor a first attribute of the component and is faulty, and wherein generating the fault accommodation signal further comprises: receiving data indicative of a second monitored attribute from a second sensor of the plurality of sensors, the first attribute being a different attribute than the second attribute; and applying a conversion factor to the data indicative of the second monitored attribute so as to emulate acceptable data indicative of the first monitored attribute from the first sensor.

Clause 4. The system of any preceding clause, wherein the sensor system is a first sensor system, the system further comprising a second sensor system having at least one sensor, and wherein generating the fault accommodation signal further comprises: receiving data indicative of an operating condition of the wind turbine from the second sensor system; simulating the operating condition of the component based on the operating condition of the wind turbine as detected by the second sensor system; and emulating data from the first sensor system indicative of the operating condition of the component based on the simulation.

Clause 5. The system of any preceding clause, wherein the second sensor system has at least one environmental sensor configured to detect an environmental condition acting upon the wind turbine and at least one operating sensor configured to detect a performance of the wind turbine in response to the environmental condition, and wherein simulating the operating condition of the component comprises: correlating the operating condition of the component to the performance of the wind turbine for the detected environment condition based on a historical data set, wherein the historical data set includes wind turbine performance points in response to various environmental conditions and the corresponding operating condition of the component at the various wind turbine performance points.

Clause 6. The system of any preceding clause, wherein the component is a first component and wherein the second sensor system is configured to monitor an operating condition of a second component of the wind turbine, and wherein simulating the operating condition of the first component comprises: correlating the operating condition of the first component to the operating condition of the second component of the wind turbine.

Clause 7. The system of any preceding clause, wherein generating the accommodation signal further comprises: receiving, from the first sensor system, data indicative of a first sensor system fault, wherein the first sensor system fault indicates an absence of sensor data available within the first sensor system for emulating acceptable data from at least one sensor of the plurality of sensors.

Clause 8. The system of any preceding clause, wherein the system comprises a blade monitoring system, and wherein the component comprises a blade of the wind turbine.

Clause 9. The system of any preceding clause, wherein the first component is a first blade of the wind turbine, and wherein the second component is a second blade of the wind turbine.

Clause 10. The system of any preceding clause, the plurality of operations further comprise: reducing a load limit for the wind turbine in response to the generation of the fault accommodation signal.

Clause 11. A method for controlling a wind turbine, the method comprising: receiving, via a controller, data indicative of an operating condition of a component of the wind turbine from a sensor system, the sensor system comprising at least one sensor operably coupled to the component; detecting, via a fault module, an output signal of the at least one sensor indicative of a sensor fault; generating, via the fault module, a fault accommodation response, the fault accommodation response comprising an accommodation signal which replaces the output signal indicative of the sensor fault; causing, via the controller, a change in an operating state of the wind turbine based at least upon the accommodation signal.

Clause 12. The method of any preceding clause, wherein the sensor system comprises a plurality of sensors operably coupled to the component, a first sensor of the plurality of sensors is in a first position and is faulty, a second sensor of the plurality of sensors is operational, and wherein generating the fault accommodation signal further comprises:

receiving data indicative of the operating condition from the second sensor in a second position relative to the component, wherein the second position is different than the first position; and applying a weighting factor to the data received from the second sensor so as to emulate acceptable data indicative of the operating condition from the first sensor, wherein the weighting factor accommodates for the difference in locations of the first and second sensors.

Clause 13. The method of any preceding clause, wherein the sensor system comprises a plurality of sensors operably coupled to the component, a first sensor of the plurality of sensors being configured to monitor a first attribute of the component and being faulty, and wherein generating the fault accommodation signal further comprises: receiving data indicative of a second monitored attribute from a second sensor of the plurality of sensors, the first attribute being a different attribute than the second attribute; and applying a conversion factor to the data indicative of the second monitored attribute so as to emulate acceptable data indicative of the first monitored attribute from the first sensor.

Clause 14. The method of any preceding clause, wherein the sensor system is a first sensor system, the system further comprising a second sensor system having at least one sensor, and wherein generating the fault accommodation signal further comprises: receiving data indicative of an operating condition of the wind turbine from the second sensor system; simulating the operating condition of the component based on the operating condition of the wind turbine as detected by the second sensor system; and emulating data from the first sensor system indicative of the operating condition of the component based on the simulation.

Clause 15. The method of any preceding clause, wherein the component is a first component and wherein the second sensor system is configured to monitor an operating condition of a second component of the wind turbine, and wherein simulating the operating condition of the first component comprises: correlating the operating condition of the first component to the operating condition of the second component of the wind turbine.

Clause 16. The method of any preceding clause, wherein the first component is a first blade of the wind turbine, and wherein the second component is a second blade of the wind turbine.

Clause 17. The method of any preceding clause, wherein generating the accommodation signal further comprises: receiving, from the first sensor system, data indicative of a first sensor system fault, wherein the first sensor system fault indicates an absence of sensor data available within the first sensor system for emulating acceptable data from at least one sensor of the plurality of sensors.

Clause 18. A wind turbine, comprising: a tower secured atop a foundation; a nacelle mounted atop the tower; a rotor mounted to the nacelle; at least one rotor blade mounted to the rotor; and a blade monitoring system operably coupled to the at least one rotor blade, the blade monitoring system comprising: a sensor system comprising at least one sensor operably coupled to the at least one rotor blade so as to detect an operating condition of the component, and a controller communicatively coupled to the sensor system, the controller comprising at least one processor configured to perform a plurality of operations, the plurality of operations comprising: detecting, via a fault module, an output signal of the at least one sensor indicative of a sensor fault; generating, via the fault module, a fault accommodation signal, and replacing the output signal of the at least one sensor with the fault accommodation signal so as to cause a change in an operating state of the wind turbine.

Clause 19. The wind turbine of any preceding clause, wherein the sensor system comprises a plurality of sensors operably coupled to the at least one rotor blade, a first sensor of the plurality of sensors being in a first position and being faulty, a second sensor of the plurality of sensors being operational, and wherein generating the fault accommodation signal further comprises: receiving data indicative of the operating condition from the second sensor in a second position relative to the at least one rotor blade, wherein the second position is different than the first position; and applying a weighting factor to the data received from the second sensor so as to emulate acceptable data indicative of the operating condition from the first sensor, wherein the weighting factor accommodates for the difference in locations of the first and second sensors.

Clause 20. The wind turbine of any preceding clause, wherein the at least one rotor blade is a first rotor blade, wherein the sensor system is a first sensor system, the system further comprising a second sensor system having at least one sensor operably coupled to a second rotor blade, and wherein generating the fault accommodation signal further comprises: receiving data indicative of an operating condition of the second rotor blade from the second sensor system; simulating the operating condition of the first rotor blade based on the operating condition of the second rotor blade as detected by the second sensor system; and emulating data from the first sensor system indicative of the operating condition of the first rotor blade based on the simulation.

What is claimed is:

1. A system for controlling a wind turbine, the system comprising:
   a sensor system comprising a plurality of sensors operably coupled to a rotor blade of the wind turbine, the plurality of sensors comprising a first sensor in a first edgewise location at a leading edge of the rotor blade, second sensor in a different, second edgewise location in proximity to the leading edge of the rotor blade, a third sensor in a first flapwise location on at least one of a pressure side or suction side of the rotor blade, and a fourth sensor in second flapwise location on the same of at least one of the pressure side or the suction side; and
   a controller communicatively coupled to the sensor system, the controller comprising at least one processor configured to perform a plurality of operations, the plurality of operations comprising:
     detecting, via a fault module, an output signal from at least one of the first, second, third, or fourth sensors being indicative of a sensor fault;
     identifying the at least one of the first, second, third, or fourth sensors as being a faulty sensor;
     generating, via the fault module, a fault accommodation signal, wherein generating the fault accommodation signal further comprises receiving data indicative of an operating condition from the other of the at least one of the first, second, third, or fourth sensors and applying a weighting factor to the data indicative of the operating condition from the other of the at least one of the first, second, third, or fourth sensors so as to emulate acceptable data indicative of the operating condition from the faulty sensor, wherein the weighting factor accommodates for different locations of the first, second, third, and fourth sensors; and replacing the output signal of the faulty sensor with the fault accommodation signal so as to cause a change in an operating state of the wind turbine.

2. The system of claim 1, wherein the first sensor is configured to monitor a first attribute of the rotor blade and is faulty, and wherein generating the fault accommodation signal further comprises:
receiving data indicative of a second monitored attribute from the other of the at least one of the first, second, third, or fourth sensors, the first attribute being a different attribute than the second attribute; and
applying a conversion factor to the data indicative of the second monitored attribute so as to emulate acceptable data indicative of the first monitored attribute from the first sensor.

3. The system of claim 1, wherein the sensor system is a first sensor system, wherein generating the fault accommodation signal further comprises:
simulating the operating condition of the rotor blade based on an estimated operating condition of the wind turbine as detected by a second sensor system; and
emulating data from the first sensor system indicative of the operating condition of the rotor blade based on the simulation.

4. The system of claim 3, wherein the second sensor system has at least one environmental sensor configured to detect an environmental condition acting upon the wind turbine and at least one operating sensor configured to detect a performance of the wind turbine in response to the environmental condition, and wherein simulating the operating condition of the rotor blade comprises:
correlating the operating condition of the rotor blade to the performance of the wind turbine for the detected environment condition based on a historical data set, wherein the historical data set includes wind turbine performance points in response to various environmental conditions and the corresponding operating condition of the rotor blade at the various wind turbine performance points.

5. The system of claim 3, wherein the estimated operating condition relates to a different component of the wind turbine, and wherein simulating the operating condition of the rotor blade comprises:
correlating the operating condition of the rotor blade to the estimated operating condition of the different component of the wind turbine.

6. The system of claim 3, wherein generating the accommodation signal further comprises:
receiving, from the first sensor system, data indicative of a first sensor system fault, wherein the first sensor system fault indicates an absence of sensor data available within the first sensor system for emulating acceptable data from the first sensor.

7. The system of claim 1, wherein the system comprises a blade monitoring system.

8. The system of claim 5, wherein the rotor blade is a first rotor blade of the wind turbine, and wherein the different component is a second rotor blade of the wind turbine.

9. The system of claim 1, the plurality of operations further comprise:
reducing a load limit for the wind turbine in response to generating the fault accommodation signal.

10. A method for controlling a wind turbine, the method comprising:
receiving, via a controller, data indicative of an operating condition of a rotor blade of the wind turbine from a sensor system, the sensor system comprising a plurality of sensors operably coupled to the rotor blade, the plurality of sensors comprising a first sensor in a first edgewise location at a leading edge of the rotor blade, a second sensor in a different, second edgewise location in proximity to the leading edge of the rotor blade, a third sensor in a first flapwise location on at least one of a pressure side or suction side of the rotor blade, and a fourth sensor in second flapwise location on the same of at least one of the pressure side or the suction side;
detecting, via a fault module, an output signal from at least one of the first, second, third, or fourth sensors being indicative of a sensor fault;
identifying the at least one of the first, second, third, or fourth sensors as being a faulty sensor:
generating, via the fault module, a fault accommodation response, the fault accommodation response comprising an accommodation signal which replaces the output signal indicative of the sensor fault, wherein generating the fault accommodation response further comprises receiving data indicative of an operating condition from the other of the at least one of the first, second, third, or fourth sensors and applying a weighting factor to the data indicative of the operating condition from the other of the at least one of the first, second, third, or fourth sensors so as to emulate acceptable data indicative of the operating condition from the faulty-sensor, wherein the weighting factor accommodates for different locations of the first, second, third, and fourth sensors; and
causing, via the controller, a change in an operating state of the wind turbine based at least upon the accommodation signal.

11. The method of claim 10, wherein the sensor system is a first sensor system, the system further comprising a second sensor system having at least one sensor, and wherein generating the fault accommodation signal further comprises:
receiving data indicative of an operating condition of the wind turbine from the second sensor system;
simulating the operating condition of the rotor blade based on the operating condition of the wind turbine as detected by the second sensor system; and
emulating data from the first sensor system indicative of the operating condition of the rotor blade based on the simulation.

12. The method of claim 11, wherein the second sensor system is configured to monitor an operating condition of a different component of the wind turbine, and wherein simulating the operating condition of the rotor blade comprises:
correlating the operating condition of the rotor blade to the operating condition of the different component of the wind turbine.

13. The method of claim 12, wherein the rotor blade is a first rotor blade of the wind turbine, and wherein the different component is a second rotor blade of the wind turbine.

14. The method of claim 11, wherein generating the accommodation signal further comprises:
receiving, from the first sensor system, data indicative of a first sensor system fault, wherein the first sensor system fault indicates an absence of sensor data available within the first sensor system for emulating acceptable data from at least one sensor of the plurality of sensors.

15. A wind turbine, comprising:
a tower secured atop a foundation;
a nacelle mounted atop the tower;

a rotor mounted to the nacelle;

at least one rotor blade mounted to the rotor; and a blade monitoring system operably coupled to the at least one rotor blade, the blade monitoring system comprising:

a sensor system comprising a plurality of sensors operably coupled to the at least one rotor blade, the plurality of sensors comprising a first sensor in a first edgewise location at a leading edge of the rotor blade, a second sensor in a different, second edgewise location in proximity to the leading edge of the rotor blade, a third sensor in a first flapwise location on at least one of a pressure side or suction side of the rotor blade, and a fourth sensor in second flapwise location on the same of at least one of the pressure side or the suction side; and    a controller communicatively coupled to the sensor system, the controller comprising at least one processor configured to perform a plurality of operations, the plurality of operations comprising:

detecting, via a fault module, an output signal from at least one of the first, second, third, or fourth sensors being indicative of a sensor fault,       identifying the at least one of the first, second, third, or fourth sensors as being a faulty sensor;

generating, via the fault module, a fault accommodation signal, wherein generating the fault accommodation response further comprises receiving data indicative of an operating condition from the other of the at least one of the first, second, third, or fourth sensors and applying a weighting factor to the data indicative of the operating condition from the other of the at least one of the first, second, third, or fourth sensors so as to emulate acceptable data indicative of the operating condition from the faulty-sensor, wherein the weighting factor accommodates for different locations of the first, second, third, and fourth sensors, and       replacing the output signal of the faulty sensor with the fault accommodation signal so as to cause a change in an operating state of the wind turbine.

16. The wind turbine of claim 15, wherein the at least one rotor blade is a first rotor blade, wherein the sensor system is a first sensor system, the system further comprising a second sensor system having at least one sensor operably coupled to a second rotor blade, and wherein generating the fault accommodation signal further comprises:

receiving data indicative of an operating condition of the second rotor blade from the second sensor system;

simulating the operating condition of the first rotor blade based on the operating condition of the second rotor blade as detected by the second sensor system; and    emulating data from the first sensor system indicative of the operating condition of the first rotor blade based on the simulation.

\* \* \* \* \*